March 8, 1960 B. R. CARSON 2,927,794

SINGLE AUTOMATIC SLOT RECORD PLAYER

Filed Sept. 1, 1954 4 Sheets-Sheet 1

INVENTOR.
Benjamin R. Carson

BY H. L. Newton

ATTORNEY

March 8, 1960 B. R. CARSON 2,927,794

SINGLE AUTOMATIC SLOT RECORD PLAYER

Filed Sept. 1, 1954 4 Sheets-Sheet 2

INVENTOR.

Benjamin R. Carson

BY H. D. Newton

ATTORNEY

March 8, 1960 B. R. CARSON 2,927,794

SINGLE AUTOMATIC SLOT RECORD PLAYER

Filed Sept. 1, 1954 4 Sheets-Sheet 3

INVENTOR.
Benjamin R. Carson

BY H. W. Newton

ATTORNEY

March 8, 1960 B. R. CARSON 2,927,794

SINGLE AUTOMATIC SLOT RECORD PLAYER

Filed Sept. 1, 1954 4 Sheets-Sheet 4

INVENTOR.
Benjamin R. Carson
BY H. L. Newton
ATTORNEY

United States Patent Office 2,927,794

Patented Mar. 8, 1960

2,927,794

SINGLE AUTOMATIC SLOT RECORD PLAYER

Benjamin R. Carson, Collingswood, N.J., assignor to Radio Corporation of America, a corporation of Delaware Application September 1, 1954, Serial No. 453,555

6 Claims. (Cl. 274—9)

This invention relates to phonograph record players, and more particularly to phonograph record players of the type having a cabinet with a lateral opening, or slot through which a record is inserted for individual playing.

Record players of the slot loading type in which the insertion of a record for playing actuates the record playing mechanism has many advantages, among which is the protection afforded the parts thereof which might otherwise be easily damaged by dust or the improper handling of a child or unskilled person. Furthermore, since the tone arm and turntable are completely enclosed and out of sight these parts may be inexpensive unfinished castings or the like.

This type of record player also offers new vistas in cabinet styling since the mechanism thereof need not be seen or be handled during the operation thereof and may be completely enclosed, except for the slot, without any necessity for gaining easy access to the record playing mechanism. However, due to the relatively complicated operating mechanism of slot record players heretofore known, the cost of production has been roughly comparable to that of the more conventional automatic record changers which handle a plurality of records. In addition to the high cost, the adjustments made necessary by the complexity of the known types of slot record changers are only aggravated by the inaccessability of the playing mechanism.

Accordingly it is an object of this invention to provide an improved phonograph record player adapted to operate in a cabinet having a record receiving slot in one side thereof, which is simple and rugged in construction, which is easily fabricated at low cost, and which operates without adjustment or attention in use.

In accordance with the invention, the record player is provided with a motorboard which is pivotally mounted at the rear of the record player cabinet so that the front part of the motorboard is adjacent the record receiving slot and movable in substantially a vertical direction. The motorboard carries a rotatable turntable which has a central pilot for receiving and centering the records inserted through the slot.

A record reproducing device, which may include a pickup and a tone arm mounted on a fixed support, such as a wall of the cabinet in such a manner that the pickup is positioned above the lead-in groove of the record to be played. The tone arm is pivotally movable in a horizontal plane to permit the pickup to follow the grooves of the phonograph record, and is biased to return to the starting position when not in contact with a phonograph record.

A manually operable control lever which is fastened to the front end of the motorboard projects from the front of the cabinet immediately below the record receiving slot to provide a manual control means for raising the motorboard and turntable from a lower record loading position to an upper record playing position. The motorboard is held in the upper position during the record playing cycle by means of a latch which may be manually or automatically operated. A switch in the turntable driving motor power circuit is controlled by the movement of the motorboard to supply power to the motor when the motorboard is in the upper playing position. In the case of a spring wound phonograph motor, the switch control is modified to operate a brake or other suitable starting and stopping device.

To initiate a record playing cycle, all that need be done is to insert a record in the slot and lift the control lever to the upper portion. Since the control lever is conveniently located immediately beneath the loading slot the loading and raising of the control lever can be accomplished by a single operation. At the end of a record playing cycle, a tripping mechanism operable in response to a predetermined movement of the tone arm causes the latch to disengage and release the motorboard which falls to the lower position. As the motorboard falls, the switch is actuated to deenergize the turntable driving motor, and the tone arm which is no longer supported by the phonograph record, returns to the starting position.

The simple and compact structure afforded by a record player constructed in accordance with the invention enables it to be combined with the table model radio or television receivers and the like, in cabinets having a size on the order of that presently being used.

It is accordingly another object of this invention to provide an improved slot-type phonograph record player wherein the turntable is tiltable between a lower record loading position and an upper record playing position, thereby to effect simplification of the mechanism thereof.

Another object of this invention is to provide an improved phonograph record player of the type described wherein records may be loaded onto a turntable through a horizontal slot in the side of the record player cabinet and may be moved upwardly to a record playing position and into contact with a record reproducing device.

Still another object of this invention is to provide a phonograph record player of the type described, which is of simplified and compact construction and thereby can be incorporated in radio or television receiver cabinets at small additional cost and without requiring a large amount of additional cabinet space.

A further object of this invention is the provision of a simplified tripping mechanism for a record player which is actuated at the completion of a record playing cycle to stop the record player and which resets itself automatically in preparation for the next record playing cycle.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2, 3:
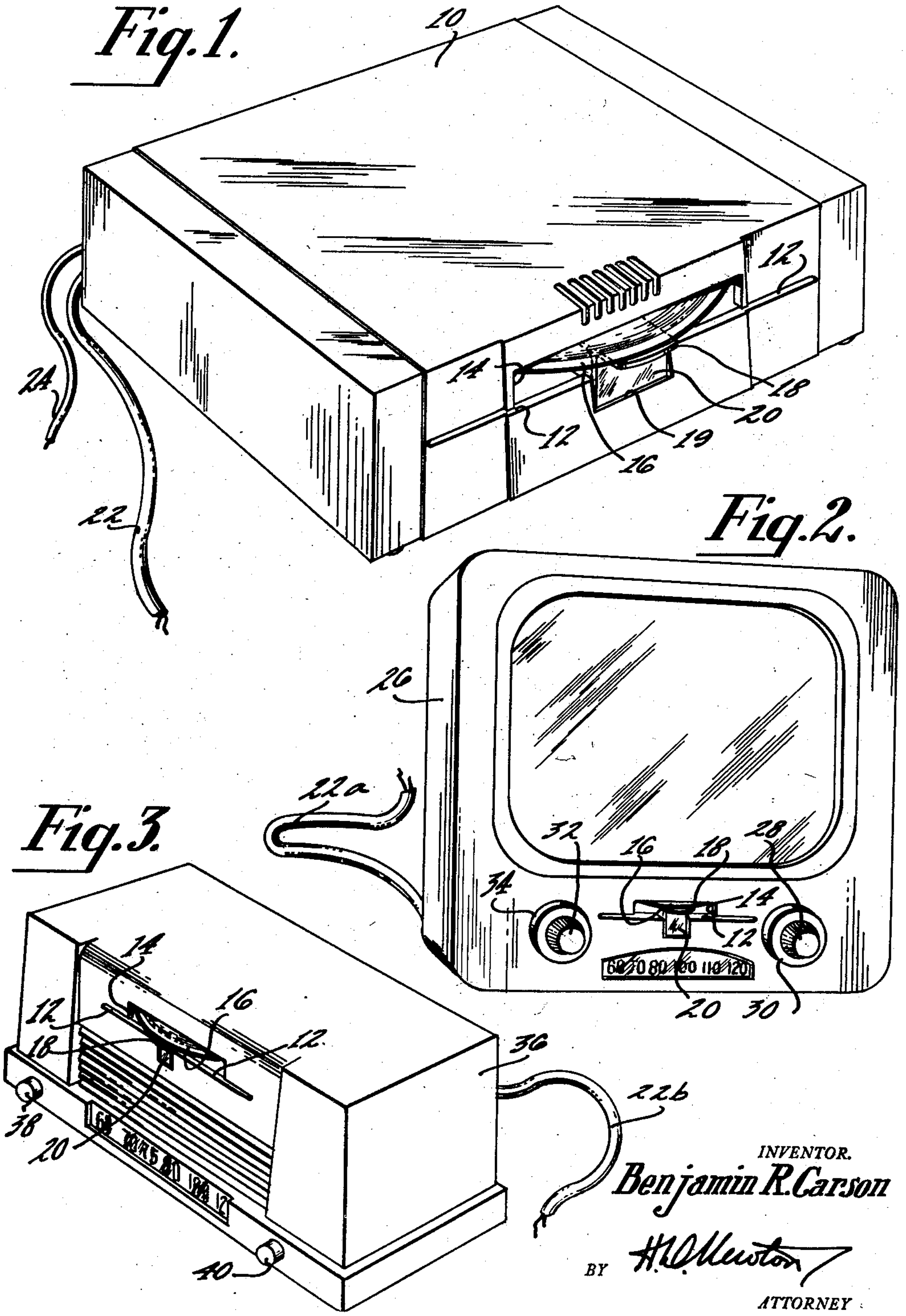
Figure 1 is a perspective view of a slot type record player constructed in accordance with the invention showing a record in the record playing position.
Figure 2 is a perspective view of a television receiver incorporating the slot-type record player of the invention between the control knobs thereof.
Figure 3 is a perspective view of a table model broadcast radio receiver incorporating the slot-type record player of the invention in the upper front panel thereof.

Referring now to the drawings wherein like reference characters designate like parts throughout, and referring more particularly to Figure 1, the record player of the invention is illustrated as an assembly not including a self contained amplifier or loudspeaker and requires an external connection to a suitable amplifier and loudspeaker. Naturally, if desired, the cabinet 10 could be physically enlarged to receive an amplifier and loudspeaker.

The cabinet 10 which may be styled to suit the tastes of the designer is provided with a slot in the front side thereof. The ends 12 of the slot have a vertical dimension or width substantially corresponding to the width of a phonograph record, which in the case shown is a 45 r.p.m. record. The ends 12 of the slot provide a record loading guide through which a record may be inserted and guided onto the turntable without touching other parts of the record playing mechanism such as the tone arm. When the record is centered on the turntable, part of the record still projects from the cabinet 10 to facilitate removal thereof. The slot also has an intermediate portion 14 of increased vertical dimension, from which a record extends during the record playing cycle, and which is of sufficient dimension so the record may undulate without rubbing against the edge of the slot.

After a record 16 has been loaded on the turntable, the motorboard and turntable, as will be hereinafter described, are raised by means of the control lever 18 to the record playing position, as shown, where the record engages suitable record reproducing means. In the record playing position the latch 20 effectively blocks the record loading portion of the slot so that a record may not be forced in while the mechanism is in the record playing position. Furthermore the lateral dimension of the intermediate slot portion 14 is small enough so that a record may not be withdrawn while the reproducing means is in contact therewith.

The latch 20 which is pivotally mounted, moves to rest against the edge of a slot portion 19 as the control lever 20 is raised and thus support the motorboard and turntable in the upper record playing position. At the completion of the record playing cycle, mechanism described hereinafter automatically disengages the latch 20 by pulling it back away from the edge 19 to allow the turntable and motorboard to fall to the record loading position, so the record just played may be removed, and a new record inserted for playing. The operator may manually stop the changer by merely depressing the latch 20 and allowing the control lever and motorboard to fall to the record loading position.

A power cord 22 is provided for connection with a suitable power source for energizing the turntable drive motor. A second electrical connecting lead 24, which may have a braided metallic shield, is provided for conveying the audio frequency signals from the phonograph record reproducer to a suitable amplifier.

Referring now to Figure 2, the slot-type record player of invention is shown in combination with a table model television receiver having a cabinet with a large aperture in the upper front portion thereof for receiving the front surface or face of a television picture tube. The television receiver has the usual control knobs including a station or channel selector knob 28, and a fine tuning control knob 30. The receiver also has a knob 32 for controlling the contrast of the light and dark portions of the picture, and a volume control knob 34 which may also serve as an on and off switch. The record player slot is positioned directly beneath the picture tube and between the control knobs 32, 34, and 28, 30 and the mechanism therefor is fastened to the inside of the cabinet behind the slot. It should be understood that the particular position of record player in the television receiver cabinet is not important, and may be positioned where there is sufficient space available behind the slot to receive the record playing mechanism. The record loading slot 12 and playing slots 14 may be either cut into the cabinet 26 after fabrication thereof or formed while the cabinet is being constructed.

The record reproducing means is preferably electrically connected with the television receiver audio amplifier, not shown, and the signals amplified thereby are conveyed to the television receiver loud speaker for reproduction. A separate phonograph switch position may be provided on the channel selector knob 30 for energizing the turntable driving motor and the audio amplifier section of the television receiver. In some cases it may be desirable to connect the television receiver for standby operation while a record is being played or alternatively to have the television picture displayed, but mute the sound portion of the signal in favor of the phonograph signals.

In these cases at the completion of the record playing cycle or at some time during the record playing cycle, the operator may switch to a desired television program without having to wait for the receiver to warm up.

Referring now to Figure 3 a broadcast receiver is enclosed in a cabinet 36 which has a volume control knob 38 and a tuning control knob 40 which controls a tuning indicator pointer 42 on a suitable tuning indicator dial. The slot-record changer of the invention is incorporated in the upper front face of the broadcast receiver and is shown in the record playing position. The volume control knob which provides an on-off switch for the broadcast receiver may also be provided with a "phono" position. In the "phono" position the output from the record reproducer is fed to the receiver audio amplifier for amplification and reproduction, while the signal receiving section of the receiver is suitably muted.

Figure 4:
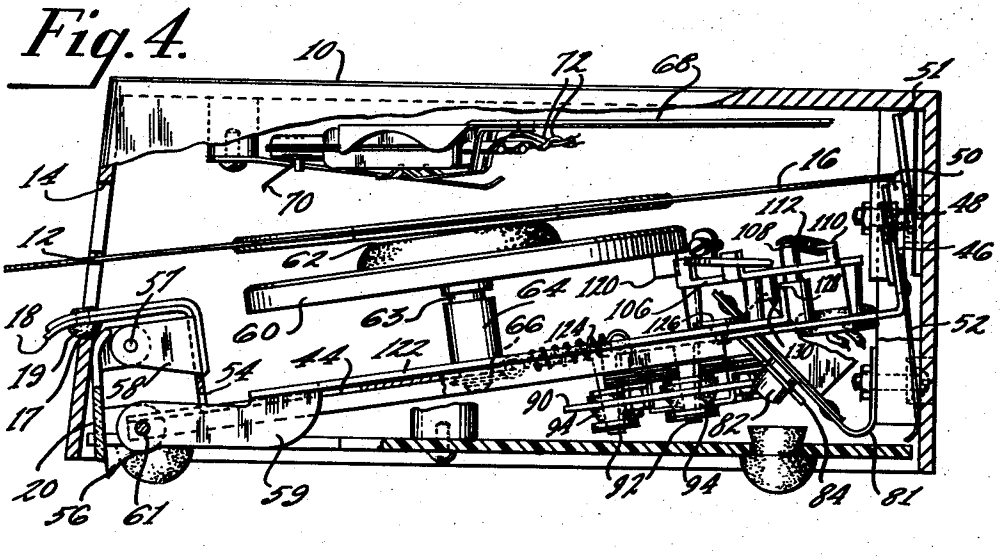
Figure 4 is a side elevational view of the record player shown in Figure 1, on an enlarged scale, having a portion of the cabinet broken away to show certain constructional details of the record playing mechanism in the record loading position.
Figures 5, 6:
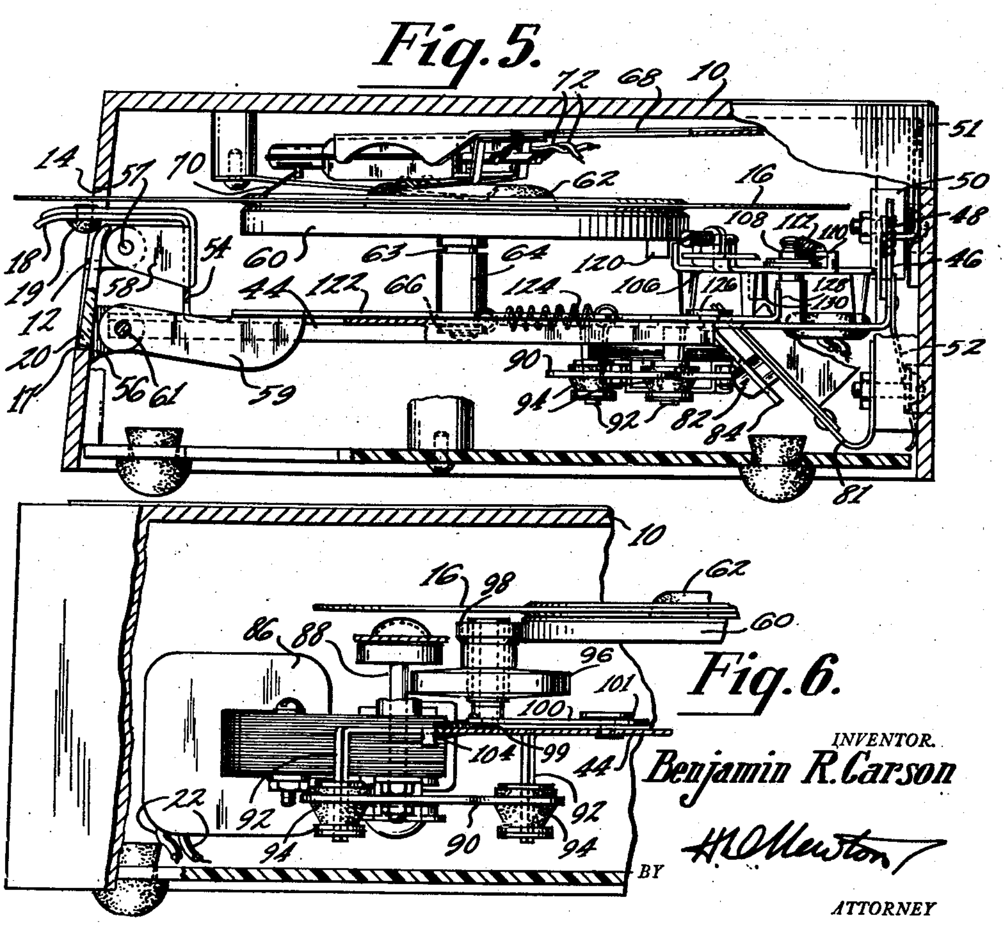
Figure 5 is a similar side elevational view, partly broken away, of the record player of Figure 1, with said mechanism shown in the record playing position.
Figure 6 is an elevational view of the turntable drive system of the record player, taken along the section lines 6—6 of Figure 7.
Figure 7:
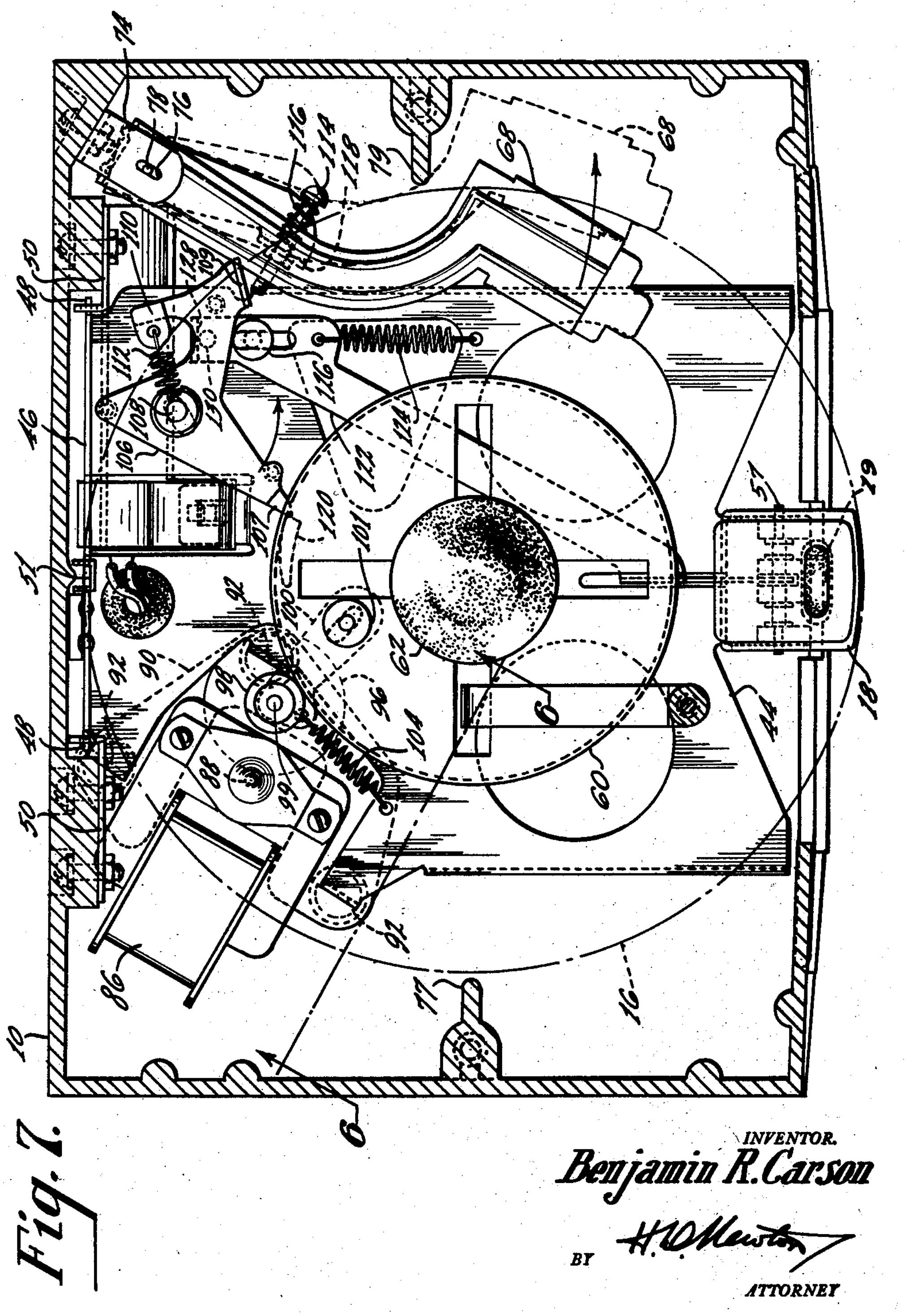
Figure 7 is a plan view of the record changer of Figure 1 on a still larger scale and substantially full size, having the top portion thereof broken away to show the relative position of certain parts thereof at the completion of the record playing cycle.

Referring now to Figure 4, the phonograph record player of the invention enclosed in the cabinet 10 as shown in Figure 1 has one side thereof broken away to show the relative position of the operating components thereof in the record loading position. The record player is shown in side elevational view with the front of the cabinet 10 shown at the left-hand side of the drawing and the rear side thereof at the right. Most of the operating elements of the record player except for the tone arm and the drive motor on-off switch are mounted on a motorboard 44 which is hinged at the rear side of the record player cabinet 10. The motorboard 44 has an upstanding flange 46 on the side toward the rear of the record player cabinet 10. The flange 46 is provided with a pair of ears 48 on either side thereof, as is best shown in Figure 7, which serve as the rear support and hinge elements for the motorboard. The ears 48 extend through apertures in the hinge mounting brackets 50 which are located on either side of the motorboard and bolted on the rear wall of the cabinet 10. The apertures in the hinge mounting bracket are large enough to permit easy pivoting of the motorboard on the ears 48 whereby the front of the motorboard may be raised by the manual control lever 18 to a horizontal position as shown in Figure 5.

A flat spring 52 extends downwardly from the motorboard flange 46 and bears against the rear wall of the cabinet 10. The spring 52 serves to hold the motorboard firmly in place against motor vibrations and the like and somewhat breaks the fall of the motorboard from the playing position to the loading position.

A stop element 51 extends upwardly from the motorboard flange 46 and is positioned to strike the rear wall of the cabinet 10 to limit the travel of the motorboard as it is moved upwardly by the control lever 18 to the record playing position.

An upstanding extension 54 on the front edge of the motorboard 44 connects the motorboard with the manual control lever 18. The control lever 18 rests against the edge 17 of the slot and limits the travel of the motorboard in the lowermost position. A button 19 which may be made of rubber or other resilient material is fastened to the under side of the control lever 18 in a position to strike the edge 17 to reduce the shock on the record changer parts as the motorboard falls from the upper record playing to the record loading position.

The latch 20 holds the motorboard 44 in the upper position during a record playing cycle by moving into the position shown in Figure 5, so that the bottom portion thereof engages the edge 17. A projection 56 on the rear surface of the latch 20 and extending therebelow provides a stop for the outward movement of the latch by engaging the inner wall of the cabinet 10 to limit the travel of the latch over the edge 17, and insure positive latching action. The latch 20 is supported at the upper end by a support bracket 58 which may be an integral part of the motorboard extension 54. A pin 57 fastens the upper end of the latch 20 to the support bracket 58, to permit pivotal movement of the latch 20.

At the lower end, the latch 20 is fastened to an extension 59 of a latch release lever 122 by a pin 61. It should be apparent that lateral movement of the latch release lever 122 away from the front edge of the cabinet pulls the latch 20 back away from the edge 17, thus allowing the motorboard 44 to fall by gravity, from the record playing position as shown in Figure 5 to the record loading position as shown in Figure 4.

Referring now to the record rotating means, a turntable 60 which is provided with a pilot 62 for centering the record 16 is mounted for rotation on the motorboard 44. The pilot shown is of large diameter and well rounded for easily receiving and centering large diameter center hole records, such as 45 r.p.m. records. Naturally a small diameter pilot could be provided if desired and necessary for accommodating small diameter center hole records. The turntable 60 rotates on a shaft 63 extending from the lower side thereof which is journaled for rotation in the bearing 64. The bearing 64 is securely fastened to the motorboard 44 and a C washer 66 is fastened in a groove on the shaft 63 to hold the turntable in place. The turntable should be of large enough diameter to cover at least the label portion of the phonograph record, but in general the actual diameter is not critical and it is primarily a design consideration.

A tone arm 68 is supported at one end thereof in the upper portion of the cabinet 10 in such a manner that a stylus 70 carried at the free end of the tone arm is positioned above the lead-in groove of the record to be played. A pair of twisted leads 72 connect the pick-up cartridge, which may be a crystal pick-up, for example, to the shielded audio lead 24 shown in Figure 1. The tone arm 68 has a U-shaped mounting bracket 74, best seen in Figures 8 and 9, which is bolted to the cabinet 70. A slot 76 is provided in the upper leg of the bracket 74 through which a tone arm mounting pin 78 extends. The elongated slot 76 permits the pin 78 and tone arm 70 to move in a vertical direction when the phonograph record is brought into connection therewith and the mounting pin 78 permits the tone arm to pivot in a horizontal plane so that the stylus 70 may follow the record grooves. The U-shaped tone arm bracket 74 is canted slightly from the vertical so that in the absence of the phonograph record in the playing position, the tone arm 68 will be gravity biased toward the starting position at the right-hand side of the cabinet 10. It will be seen that while the phonograph record is being played the vertical component of the gravity biasing is balanced out by the phonograph record, and no horizontal force is present. A tone arm stop member 79 which is formed as an integral part of the cabinet wall, limits the movement of the tone arm 68 as it swings back to the starting position so that the stylus 70 will be directly above the lead groove to be played.

A switch 80 for controlling the flow of electrical current to the turntable drive motor is mounted on a V-shaped support bracket 81 which is bolted to the rear wall of the cabinet 10. The switch 80 is provided with an on-off switch lever 82 which is moved by the switch bracket 84 which forms an integral part of the motorboard 44. Thus, when the motorboard is in the lower position, the switch lever 82 is forced downwardly to an off position by the switch bracket 84 and conversely in the upper position the switch lever 82 is pulled up to an on position by the switch bracket 84.

Referring now to Figures 6 and 7 and the turntable drive system shown therein, a turntable drive motor 86 is provided with a motor mount 90. The motor mount 90 is affixed to downwardly extending flanges 92 from the motorboard 44. Rubber grommets 94 are inserted between the flanges 92 and the motor mount 90 to isolate motorboard in so far as possible for motor vibrations.

A motor drive shaft 88 drives an idler wheel 96 which forms part of a stepped pulley including turntable drive roller 98. The idler wheel 96 and the turntable drive roller 98 are mounted for rotation on a stud 99 which is fastened to one end of a pivotally mounted lever 100. The lever 100 is fastened at the other end thereof to the motorboard 44 by a rivet 98. A spring 104 is fastened between the lever 100 and the motorboard 44 so that the idler wheel 96 and turntable drive roller 98 are firmly pulled into engagement with the motor drive shaft 88 and the turntable 60 respectively.

Figures 8, 9:
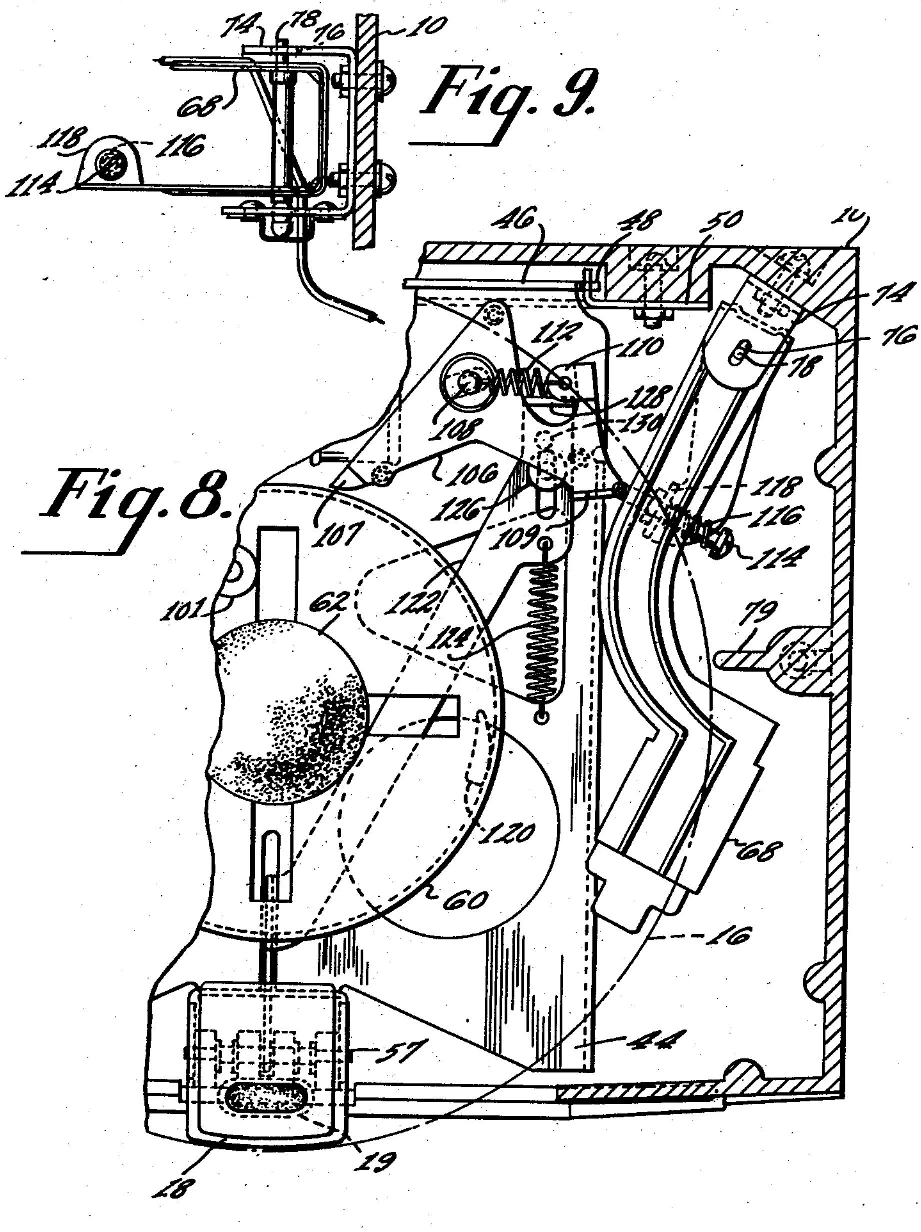
Figure 8 is a plan view of a portion of the record player shown in Figure 1 partly broken away, to show the relative position of certain operating elements thereof at the start of a record playing cycle.
Figure 9 is a side elevational view of the tone arm and mounting therefor.

Reference is now made to Figures 7 and 8, and the automatic shut off mechanism, a trip lever 106 is provided for initiating the shut off action at the completion of the record playing cycle. The trip lever 106 is pivotally movable about pin 108 and has an upstanding abutment plate 109. The abutment plate 109 is engaged by screw 114 which is fastened to a lever 118 that rotates with the tone arm 68. A spring 116 surrounding the screw 114 keeps the screw tightly in place to maintain the proper setting once the desired tripping adjustment has been made. As the tone arm moves toward the center of the turntable, the screw 114 pushes the abutment plane 109 causing the trip lever 106 to rotate on its axis 108 in a clockwise direction. A spring 112 is connected between an upstanding finger 110 and the trip lever pivot pin 108 to pull the trip lever 107 sharply counter clockwise once it has been rotated a predetermined distance.

The mechanism is set so that when the spring 112 acts to pull the trip lever 106, the tone arm has reached the eccentric tripping grooves of the phonograph record. The trip lever 106 has an arm 107 which is rotated into the path of a stud 120 which is fastened on the under side of the turntable 60. The engagement of the stud 120 with the arm 107 causes the trip lever 106 to be moved further in clockwise direction by the inertia of the turntable 60 so that a projection 130 affixed to the under side of the trip lever 106 engages an upstanding arm 128 on the latch release lever 122.

Movement of the projection 130 against the arm 128 pulls the latch release lever 122 toward the rear of the cabinet 10 against the force of a spring 124 which is connected between a point on the motorboard 44 and the release lever 122. As the release lever 122 moves, it pivots the latch 20 inwardly from the edge 17 to permit the motorboard to drop to the lower record loading position. As mentioned above when the motorboard 44 falls, the turntable driving motor 86 is deenergized by the switch 80 so that the turntable 60 ceases to rotate.

In the lower position of the motorboard 44 the spring 124 pulls the latch lever 122 toward the front of the cabinet 10 since the inertia of the turntable carries the stud 120 out of contact with the trip lever arm 107, the upstanding arm 128 on the release lever 122 engages the projection 130 to rotate the trip lever 106 back to the starting position so that upon the start of another record playing cycle the trip lever arm is clear of the turntable stud 120.

A safety mechanism is provided in the record player cabinet 10 to insure that the mechanism will not be left in the "on" position when no record is on the turntable. The safety mechanism includes an armature 132 which is fastened to the top of the cabinet 10 and rides on the turntable across the grooves 134. As the armature 132 strikes the turntable grooves, an audible clicking noise is generated, to warn the operator that the record player is in the "on" position. The end of the armature 132 which rides on the turntable is rounded so that if a record is present on the turntable, the armature will not damage the label portion on which it rides. It is preferable that the armature be affixed to the cabinet 10 through a rubber grommet or the like to insulate against interference such as vibrations which might otherwise be fed through the record to the stylus.

In the operation of the record player a record is inserted for playing when the motorboard and turntable are pivoted to the lower record loading position as shown in Figure 4. The record is guided onto the turntable by the limitations of the record loading groove 12, and the stops 77 and 79 which are formed as part of the cabinet 10, and the stop 51 which is mounted on the rear side of the motorboard 44. The control lever 18 is then manually raised until the latch 20 snaps into place on the slot edge 17 by the action of the spring 124. The switch 80 is switched to the on position as the control lever 18 is moved upwardly thereby energizing the turntable drive motor to rotate the turntable and the record thereon. The stylus 70 of the tone arm 68 engages the lead-in groove of the record in the upper position and follows the grooves toward the center of the record.

To turn the record player off anytime during the record playing cycle, the latch 20 is manually depressed to release it from the edge 17 thereby allowing the motorboard and turntable to fall to the lower record loading position. If, however, the record is played to completion, the screw 114, which rotates with the tone arm 68, bears against the abutment plate 109 causing the trip lever 106 to rotate. When the stylus 70 meets the trip groove of the phonograph record, the trip lever 106 has rotated far enough so that the spring 112 acts to pull the trip lever further in a clockwise direction thus moving the trip lever arm 107 into the path of the stud 120 which rotates with the turntable. Engagement of the tripping stud 120 with the trip lever arm 107 further rotates the trip lever 106 causing the latch release lever 122 to be moved to release the latch 20. As mentioned above, the release of the latch 20 permits the motorboard to fall to the record loading position, and the played record may then be removed through the slot 12.

It can be seen that there has been provided in accordance with the invention an improved phonograph record player with extremely simplified operating mechanisms including a pivoted motorboard and turntable assembly having a lower record loading position and an upper record playing position. This phonograph record player is simple and rugged in construction and operates without adjustment and attention in use and can be incorporated in radio and television receiver cabinets at a small additional cost and without requiring large amounts of cabinet space.

What is claimed is:

1. A phonograph record player comprising in combination, a cabinet having a record receiving slot in the front side thereof, said slot having an intermediate portion of increased vertical dimension from which a record is adapted to extend during the reproduction thereof, a motorboard positioned in said cabinet and pivotally mounted near the rear side thereof, control lever means affixed to said motorboard extending from the front of said cabinet for manually pivoting said motorboard from a lower position to an upper position, latch means comprising a lever carried by said motorboard and a member fixed relative to said motorboard, said lever spring biased to engage said member for holding said motorboard in said upper position when said motorboard is manually pivoted to an upper position, means to manually release said latch means exteriorly of said cabinet, means to automatically release said latch means at the completion of a record playing cycle whereby said motorboard drops by force of gravity to said lower position, a turntable and driving means therefor carried by said motorboard, said turntable being adjacent the record receiving slot in the lower position of said motorboard for receiving a record to be played so that a portion of a record positioned on said turntable extends from said cabinet, a tone arm mounted in the upper portion of said cabinet, said tone arm mounting being canted whereby the tone arm is biased by force of gravity toward a starting position, and record pickup device carried by said tone arm for cooperation with a phonograph record supported by said turntable in the upper record playing position thereof, said slot having a length at least as great as the diameter of a phonograph record to be played and a vertical dimension at least as great as the thickness of such a record but sufficiently small to provide a guide to prevent the record from contacting said record pickup device.

2. A phonograph record player comprising in combination, a cabinet having a record receiving slot in the front wall thereof from which a record is adapted to extend during the reproduction thereof, a motorboard positioned in said cabinet and pivotally mounted near the rear wall thereof, control lever means affixed to said motorboard extending from the front of said cabinet for manually pivoting said motorboard from a lower position to an upper position, a turntable and driving means therefor carried by said motorboard, said turntable being adjacent the record receiving slot in the lower position of said motorboard for receiving a record to be played so that a portion of a record positioned on said turntable extends from said cabinet, a tone arm mounted in the upper portion of said cabinet, a record pickup device carried by said tone arm for cooperation with a phonograph record supported by said turntable in the upper record playing position thereof, latch means comprising a member carried by said motorboard and a member fixed relative to said motorboard for holding said motorboard in said upper position when said motorboard is manually pivoted to an upper position, means to manually release said latch means exteriorly of said cabinet, and automatic latch release means carried by said motorboard and controlled by said tone arm for automatically releasing said latch means at the completion of a record playing cycle whereupon said motorboard drops by force of gravity to said lower position.

3. A phonograph record player comprising in combination, a cabinet having a record receiving slot in the front wall thereof, said slot having a length at least as great as the diameter of a phonograph record to be played and a vertical dimension near the ends thereof at least as great as the thickness of such a record and an intermediate portion of increased vertical dimension from which a record is adapted to extend during the reproduction thereof, a motorboard positioned in said cabinet and pivotally mounted near the rear wall thereof, control lever means affixed to said motorboard extending from the front of said cabinet for manually pivoting said motorboard from a lower position to an upper position, a turntable and driving means therefor carried by said motorboard, said turntable being adjacent the record receiving slot in the lower position of said motorboard for receiving a record to be played so that a portion of a record positioned on said turntable extends from said cabinet, a tone arm mounted in the upper portion of said cabinet, a record pickup device carried by said tone arm for cooperation with a phonograph record supported by said turntable in the upper record playing position thereof, latch means comprising a member carried by said motorboard and a member fixed relative to said motorboard for holding said motorboard in said upper position when said motorboard is manually pivoted to an upper position, means to manually release said latch means exteriorly of said cabinet, and automatic latch release means carried by said motorboard and controlled by said tone arm for automatically releasing said latch means at the completion of a record playing cycle whereby said motorboard drops by force of gravity to said lower position.

4. A phonograph record player comprising in combination, a cabinet having a record receiving slot in the front wall thereof, said slot having a length at least as great as the diameter of a phonograph record to be played and a vertical dimension near the ends thereof at least as great as the thickness of such a record and an intermediate portion of increased vertical dimension from which a record is adapted to extend during the reproduction thereof, a motorboard positioned in said cabinet and pivotally mounted near the rear wall thereof, control lever means affixed to said motorboard extending from the front wall of said cabinet for manually pivoting said motorboard from a lower position to an upper position, a turntable and driving means therefor carried by said motorboard, said turntable being adjacent the record receiving slot in the lower position of said motorboard for receiving a record to be played so that a portion of a record positioned on said turntable extends from said cabinet, a tone arm mounted in the upper portion of said cabinet, said tone arm mounting being canted whereby the tone arm is biased by force of gravity toward a starting position, record pickup device carried by said tone arm for cooperation with a phonograph record supported by said turntable in the upper record playing position thereof, latch means comprising a first member carried by said motorboard and a second member fixed relative to said motorboard, said first member spring biased to engage said second member for holding said motorboard in said upper position when said motorboard is manually pivoted to an upper position, means to manually release said latch means exteriorly of said cabinet, automatic latch release means including a trip lever pivotally mounted on said motorboard, and movable into the path of said turntable to effect the release of said latch so that said motorboard drops by force of gravity to said lower position, and means movable with said tone arm positioned to engage and move said trip lever so that said trip lever is moved into the path of said turntable at the completion of a record playing cycle.

5. A phonograph record player comprising in combination, a cabinet having a record receiving slot in the front wall thereof from which a record is adapted to extend during the reproduction thereof, a motorboard positioned in said cabinet and pivotally mounted near the rear wall thereof, control lever means affixed to said motorboard extending from the front of said cabinet for manually pivoting said motorboard from a lower position to an upper position, a turntable and driving means therefor carried by said motorboard, said turntable being adjacent the record receiving slot in the lower position of said motorboard for receiving a record to be played so that a portion of a record positioned on said turntable extends from said cabinet, a tone arm mounted in the upper portion of said cabinet, a record pickup device carried by said tone arm for cooperation with a phonograph record supported by said turntable in the upper record playing position thereof, latch means comprising a first member carried by said motorboard and a second member fixed relative to said motorboard, said first member spring biased to engage said second member to hold said motorboard in said upper position when said motorboard is manually pivoted to an upper position, means to manually release said latch means exteriorly of said cabinet, automatic latch release means including a trip lever pivotally mounted on said motorboard, and movable into the path of said turntable to effect the release of said latch so that said motorboard drops by force of gravity to said lower position, and means movable with said tone arm positioned to engage and move said trip lever so that said trip lever is moved into the path of said turntable at the completion of a record playing cycle.

6. A phonograph record player comprising in combination, a cabinet having a record receiving slot in the front wall thereof, said slot having a length at least as great as the diameter of a phonograph record to be played and a vertical dimension near the ends thereof at least as great as the thickness of such a record and an intermediate portion of increased vertical dimension from which a record is adapted to extend during the reproduction thereof, a motorboard positioned in said cabinet and pivotally mounted near the rear wall thereof, control lever means affixed to said motorboard extending from the front of said cabinet for manually pivoting said motorboard from a lower position to an upper position, a turntable having a raised control portion for centering a record positioned thereon and a driving motor for said turntable carried by said motorboard, said turntable being adjacent the record receiving slot in the lower position of said motorboard for receiving a record to be played so that a portion of a record positioned on said turntable extends from said cabinet, guide means including abutment members positioned in said cabinet for guiding a record inserted through said slot into substantial axial alignment with said turntable, electrical switch means connected in circuit with said phonograph motor and having an actuator element positioned for movement by said motorboard so that the electrical circuit to said driving motor is open in the lower position of said motorboard and closed in the upper position of said motorboard, a tone arm mounted in the upper portion of said cabinet, said tone arm mounting being canted whereby the tone arm is biased by force of gravity toward a starting position, record pickup device carried by said tone arm for cooperation with a phonograph record supported by said turntable in the upper record playing position thereof, latch means comprising a first member carried by said motorboard and a second member fixed relative to said motorboard, said first member spring biased to engage said second member for holding said motorboard in said upper position when said motorboard is manually pivoted to an upper position, means to manually release said latch means exteriorly of said cabinet, an abutment member carried by said turntable, automatic latch release means including a trip lever pivotally mounted on said motorboard coupled to said first member, said trip lever being movable into the path of said abutment member on said turntable to cause further movement thereof together with said first member to effect disengagement of said first member from said second member so that said motorboard drops by force of gravity to said lower position, and means movable with said tone arm positioned to engage and move said tone arm positioned to engage and move said trip lever in a manner that said trip lever is moved into the path of said abutment member on the turntable at the completion of a record playing cycle.

References Cited in the file of this patent

UNITED STATES PATENTS

| | | |
|---|---|---|
| 1,285,221 | Kideney | Nov. 19, 1918 |
| 2,278,678 | Stone | Apr. 7, 1942 |
| 2,284,043 | Clausen | May 26, 1942 |
| 2,485,575 | Deaver | Oct. 25, 1949 |
| 2,508,845 | Thompson | May 23, 1950 |
| 2,591,515 | Dale | Apr. 1, 1952 |
| 2,647,753 | Goldmark | Aug. 4, 1953 |

FOREIGN PATENTS

| | | |
|---|---|---|
| 539,492 | Great Britain | Sept. 12, 1941 |
| 975,962 | France | Mar. 12, 1951 |
| 915,274 | Germany | July 19, 1954 |